Patented May 27, 1941

2,243,630

UNITED STATES PATENT OFFICE 2,243,630

REACTION OF POLYSACCHARIDES WITH AMINOMETHYL PYRROLES

Alva L. Houk, Philadelphia, and Louis H. Bock, Glenside, Pa., assignors to Röhm & Haas Company, Philadelphia, Pa.

No Drawing. Application October 10, 1939, Serial No. 298,796

7 Claims. (Cl. 91—70)

This invention relates to the preparation of new nitrogenous derivatives of polysaccharides and particularly to the reaction of polysaccharides and their derivatives still possessing hydroxyl groups with aminomethyl pyrroles. It deals especially with the application of this reaction in dyeing and finishing textile materials, including fibers, yarns, fabrics, and films of natural or regenerated cellulosic material.

It is well known that cellulosic and starchy materials do not possess affinity for dyes which are ordinarily used for wool and silk. It is also well known that starch and the products obtained from starch and used for sizings and finishes are readily removed by water during wear or during laundering. While attempts have been made to supply cellulose with basic groups which would hold acid dyes and other attempts have been made to render starch sizings less soluble, such processes have lacked the simplicity and effectiveness which are essential for successful commercial application.

It is an object of our invention to provide a simple method for imparting to polysaccharides, a term which includes cellulose, modified cellulose, starch, modified starch, and hydrolysis products and conversion products from starch, an affinity for dyes which are ordinarily considered of value only with wool and silk. It is another object to alter such polysaccharides so that they are more resistant to the action of water. It is thus intended to improve the dyeing properties of cellulose and its derivatives and also starch and its derivatives, and at the same time improve the resistance to water of these various materials. It is a further object to improve the handle, feel, and appearance of cellulosic fabrics or films, particularly those finished with a hydroxyl-containing sizing material.

Improvements in hydroxyl-containing materials are obtained by treating them with a solution of an aminomethyl pyrrole and heating the treated materials. In this way cotton, linen, straw, regenerated cellulose, cellulose esters and ethers which still possess hydroxyl groups, starch, dextrins, sugars, ethyl starch, etc. are rendered receptive to dyes, may be softened, and may be made resistant to water, depending upon the type of aminomethyl pyrrole applied.

The aminomethyl pyrroles are obtainable by condensing an organic compound, possessing a pyrrole ring having a hydrogen atom in at least one of the positions which are beta to the pyrrole nitrogen, with formaldehyde and a non-aromatic amine having at least one hydrogen attached to its nitrogen atom. While formaldehyde reacts with pyrrole to give insoluble polymers, formaldehyde in the presence of a primary or secondary amine yields aminomethylene derivatives, which are dispersible in water, or soluble in aqueous solutions of organic or inorganic acids, thus forming acid salts. Or the aminomethyl pyrroles may be converted to the form of quaternary ammonium salts by reaction with an agent for alkylation, such as allyl bromide, ethyl sulfate, benzyl chloride, ethylene oxide, etc. The quaternary form gives the same general results as the free base or the acid salt.

The formaldehyde used in the reaction may be in the form of an aqueous solution or a solution in an organic solvent. It may also be used in the form of a polymer such paraformaldehyde or as an intermediate compound yielding formaldehyde such as one with ammonia or an amine.

A wide choice of amines is possible. Any primary or secondary non-aromatic amine is operative, for example, mono- or dimethylamine, butylamine, dibutylamine, octylmethylamine, didodecylamine, benzylmethylamine, cyclohexylamine, morpholine, piperidine, piperazine, pyrrolidine, etc.

The third reactant is pyrrole itself or a substituted pyrrole having a beta position available for substitution such as 1-methyl pyrrole; 1,2,5-trimethyl pyrrole; 1-octyl-2,5-dimethyl pyrrole, etc. Thus, it will be noted, a substituent may be attached to nitrogen or carbon. The substituent may form a ring jointly with two carbon atoms of the pyrrole ring, as in indole.

Formaldehyde, the amine, and the pyrrole are mixed and reacted. There may be used, if desired, water or organic solvent as a reaction medium. The reaction mixture is preferably heated to about 60° to 80° C. to bring the reaction substantially to completion. The order of mixing the reactants is optional. If desired, a condensation product of amine and formaldehyde, such as tetramethyl methylene diamine, may be added to the compound possessing the pyrrole ring. In general the reaction is carried out under neutral to basic conditions. If the product separates out, it may be dissolved, as indicated above, upon the addition of an acid.

Details of preparing typical aminomethyl pyrroles are shown in the following preparations—

*Preparation A*—To a mixture of 21.5 g. of tetramethyl methylene diamine and 6 g. of paraformaldehyde there was added 13.6 g. of pyrrole. Stirring at 60–65° C. for two hours gave a clear solution. This was held in vacuum at 50° C. for an hour to remove unreacted materials, leaving 27.5 g. of a yellow, slightly syrupy liquid, which is somewhat soluble in water, and is completely soluble in dilute acids. This liquid showed on analysis 21.2% nitrogen which is close to the theoretical nitrogen content of 22.5% for $C_7H_{12}N_2$.

*Preparation B*—To 21.8 g. of 1,2,5-trimethyl pyrrole was added a mixture of 40 g. of 30% formaldehyde and 80 g. of 25% dimethylamine. The mixture was stirred for two hours while the temperature was maintained at 70-80° C. When stirring was discontinued two layers formed and were separated. The upper layer was held in vacuo for 1½ hours at 90-100° C., leaving 24 g. of a dark, thin liquid, which showed on analysis 16.7% nitrogen, corresponding closely to the theory for $C_{10}H_{18}N_2$ of 16.8% nitrogen.

*Preparation C*—A mixture of 22.2 g. of N-hydroxyethyl pyrrole, 40 g. of 30% formaldehyde, 36 g. of morpholine, and 40 cc. of water was stirred together for three hours at 70° C. The product was concentrated in vacuo at 50° C. to a dark liquid, which amounted to 26 g. From analysis of this liquid it was evident that the di(morpholino-methyl) derivative was present.

*Preparation D*—To a mixture of 40 g. of 30% formaldehyde and 80 g. of 25% dimethylamine there was added 34.5 g. of di(2,5-dimethyl pyrrole) tetraethylene triamine. The reaction mixture was stirred three hours at 70° C. The solution was evaporated in vacuo at 55-60° C. to a thick, clear, light red syrup.

*Preparation E*—To 77.6 g. of piperazine hexahydrate there was added 40 g. of 30% formaldehyde and 21.8 g. of 1,2,5-trimethyl pyrrole. The mixture was stirred three hours at 70° C. The reaction product separated out as a solid, which was reheated, broken up, and washed with water. The dried solid, amounting to 48 g., showed 19.64% nitrogen on analysis.

*Preparation F*—To a mixture of 20 g. of 30% formaldehyde and 40 g. of 25% dimethylamine was added 13.5 g. of 1-allyl-2,5-dimethyl pyrrole. The mixture was stirred three hours at 75° C. Water and unreacted formaldehyde and amine were removed by heating in vacuo, leaving 17 g. of a red liquid, which contained 13.18% nitrogen by analysis.

*Preparation G*—To 10.5 g. of dimethylaminomethyl trimethyl pyrrole from Preparation B was added 12.5 g. of benzyl chloride, and the mixture was heated for two hours on the steam bath. It was then held in vacuum for one hour to remove any excess benzyl chloride. The resulting product was a dark, gummy solid, which contained 6.51% nitrogen.

The aminomethyl pyrroles react with cellulose, cellulose derivatives, starch, the hydrolysis products of starch including soluble starches, dextrins, sugars, etc., or other polysaccharides when heated together. If fibers, yarns, or fabrics are to be treated, they are dipped, sprayed, coated, or printed (when local effects are desired) with a dispersion or solution of an aminomethyl pyrrole. They are then dried and heated, preferably between 100° and 140° C. The drying and heating may be performed in one continuous operation or in two steps, as desired. As a final step, it is desirable to wash the treated material.

When an aminomethyl derivative of a pyrrole having at least one amino nitrogen in the side chain is used, the cellulosic material acquires an affinity for wool and silk dyes and may be subjected to the usual dyeing processes used with such dyes. The cellulosic material may first be treated according to the above procedure or an aminomethyl amino-substituted pyrrole may be added directly to the dye bath and the fibers or fabric treated directly, the dyed material being subsequently heated.

As examples of suitable aminomethyl pyrroles having amino nitrogen in the side chain, there may be mentioned the product formed in Preparation D above, or 1-β-aminoethyl pyrrole, 1-β-aminoethyl-2,5-dimethyl pyrrole, or 1-aminophenyl-2,5-dimethyl pyrrole, or 1-zeta-aminohexyl-2,5-dimethyl pyrrole.

When it is desired to render polyhydroxy compounds, such as ethyl cellulose, hydroxyethyl cellulose, methyl cellulose, starch or starch products, such as ethyl starch, soluble starch, hydrolysis products, etc., relatively insoluble, they may be mixed with any aminomethyl pyrrole and applied to yarn, fabric, a previously formed film of cellulosic material, etc. Some of these hydroxyl-containing materials may be formed into useful films from solutions containing an aminomethyl pyrrole and when this film is heated, it becomes insoluble in water. Such a pellicle may be used for wrappers, covers, photographic films, etc. Whether applied to a support or made into a pellicle, the polyhydroxy compounds are modified on being heated with an aminomethyl pyrrole, being rendered less soluble. At the same time if a pyrrole having a nitrogen-bearing substituent be used, they are rendered sufficiently basic to have an affinity for wool and silk dyes. Thus, when desired, fabric may be sized with a polysaccharide, treated with an aminomethyl aminoalkyl pyrrole, and the sized fabric then dyed. This permits both size and fabric to be dyed throughout with acid or wool dyes and is a preferred procedure.

While it is most convenient to use a one-bath process for finishing fabrics and insolubilizing the size, there may also be used, when desired, multiple step processes in which sizing, fixation of size, and dyeing are accomplished in separate steps. Prepared mixtures containing size and fixing agent may be prepared. Prepared compositions may be used in which the size is partially toughened or pre-treated before the application of sizing material, such preparations being of particular interest in the treatment of fibers, as in paper-making. The amount of an aminomethyl pyrrole required will depend upon the particular compound chosen and the effect to be produced. In general, in fixing sizes one part of an aminomethyl pyrrole may be used with one-half to ten parts of a polysaccharide. When cellulose fibers are treated to develop affinity for wool and silk dyes, the treating solutions may vary from a few percent to a saturated solution of an aminomethyl pyrrole having a nitrogen-bearing substituent.

Typical applications are shown in the following examples:

*Example 1*—Cotton fabric was coated with a paste containing 4 parts of 7% aqueous hydroxyethyl cellulose and 1 part of the acetate of dimethylaminomethyl pyrrole. The excess paste was squeezed off, the fabric was dried, heated one-half hour at 130-135° C., and washed thoroughly with alkaline soap solution. The cloth was very stiff and was medium brown in color.

*Example 2*—Linen fabric was coated with an 8% potato starch paste to which was added 20% of its weight of a 25% solution of the acetate of dimethylaminomethyl N-hydroxyethyl pyrrole. It was then treated by the procedure outlined in Example 1. The linen acquired a very stiff finish which was fast to washing.

Example 3—A viscose rayon fabric was coated with a paste obtained by mixing 5 parts of 8% tapioca starch paste and 1 part of a 25% solution of morpholinomethyl 1-allyl-2,5-dimethyl pyrrole hydrochloride. After this fabric was treated by the procedure shown in Example 1, it was brown in color and was very stiff.

Example 4—Cotton sheeting was coated with a solution containing 6% water-soluble hydroxyethyl cellulose and 4.2% of the benzyl chloride quaternary salt of dimethylaminomethyl 1,2,5-trimethyl pyrrole. Excess size was removed on squeezing the cloth through rollers. The fabric was then dried and heated for about thirty minutes in an oven at at 130° C. A very stiff, permanent finish was obtained.

Example 5—Cotton yarn was dipped through an aqueous solution containing 6.5% hydroxyethyl cellulose and 2.5% of the acetate of the product from reaction of diamethylamine, formaldehyde, and 1,1'-bis (2,5-dimethylpyrryl) tetraethylene triamine. It was squeezed, dried, and heated in an oven at 130° C. for about thirty minutes, becoming quite stiff.

Example 6—A cellulose acetate fabric was coated with an aqueous paste made by mixing 5 parts of a 4.2% solution of water-soluble ethyl cellulose and 1 part of a 25% solution of the piperazinomethyl derivative of 1,2,5-trimethyl pyrrole, as the acetate. It was squeezed and treated as in Example 1. A moderately stiff finish resulted.

Example 7—Cotton lawn was coated with a clear paste comprised of 5 parts of a 7% solution of hydroxyethyl cellulose and 1 part of a 25% solution of the benzyl chloride quaternary salt of 1,2,5-trimethyl pyrrole. The processing was carried out as in Example 1. A very stiff fabric resulted, which was chocolate brown in color.

Example 8—To 5 parts of a 7.2% solution of hydroxy ethyl cellulose was added 1 part of a 20% solution of the hydrochloride of the dimethylaminomethyl derivative of 1,1'-bis(2,5-dimethyl pyrryl) tetraethylene triamine. The paste was diluted with 50% of its weight of water, spread out on a glass plate, and heated one-half hour at 130-135° C. A clear, soft film was formed, which was insoluble when soaked in water.

Example 9—Example 8 was repeated, using an 8% potato starch paste instead of the cellulose solution. A brittle film was formed which did not soften when soaked in water.

Example 10—Cotton cloth was immersed in a 25% solution of the acetate of 1,1'-bis(2,5-dimethyl pyrryl) tetraethylene triamine. It was squeezed, baked thirty minutes at 130° C., and washed in hot soap suds. After the thorough washing, it was dyed with Pontacyl Carmine 6-B. A deep purple color was obtained which was fast to laundering. The same results were obtained when the dye was mixed with the pyrrole derivative and the mixture was applied and baked as above.

Example 11—An 80 x 80 cotton sheeting was coated with a solution comprising 5 parts of a 7.5% solution of hydroxyethyl cellulose and 1 part of a 25% solution of the product obtainable by reacting one mol of 1-hydroxyethyl-2,5-dimethyl pyrrole, two mols of formaldehyde, and two mols of monomethylamine, and making the solution acid with acetic acid. The treated sheeting was squeezed, dried, heated one-half hour at 130° C., and washed. A moderate stiffness and light tan color were obtained.

We claim:

1. A method for preparing nitrogenous derivatives of polysaccharides which comprises treating the polysaccharide with a solution of a condensate of formaldehyde, a non-aromatic amine having a hydrogen attached to its nitrogen atom and a compound possessing a pyrrole ring having available for substitution hydrogen in at least one of the positions which are beta to the pyrrole nitrogen, and heating the mixture of polysaccharide and condensate.

2. A method for preparing nitrogenous derivatives of polysaccharides which comprises treating the polysaccharide with a solution of a condensate of formaldehyde, dimethylamine, and a pyrrole having available for substitution hydrogen in at least one of the positions which are beta to the pyrrole nitrogen, and heating the mixture of polysaccharide and condensate.

3. A method for insolubilizing a polysaccharide sizing on a textile fabric which comprises applying said sizing and an aminomethyl pyrrole to the fabric, and subsequently heating the treated fabric.

4. A method for rendering polysaccharides receptive to wool and silk dyes which comprises treating said polysaccharides with an aminomethyl pyrrole having a nitrogen-bearing substituent and heating the treated polysaccharide.

5. A method for rendering cellulose receptive to wool and silk dyes which comprises treating said cellulose with an aminomethyl pyrrole having a nitrogen-bearing substituent and heating the treated cellulose.

6. A complex reaction product of a polysaccharide and an aminomethyl pyrrole.

7. Cellulosic material carrying a complex reaction product of a polysaccharide and a condensation product of formaldehyde, a non-aromatic amine having a hydrogen on its nitrogen, and a pyrrole having available for substitution hydrogen in at least one of the positions which are beta to the pyrrole nitrogen.

ALVA L. HOUK.
LOUIS H. BOCK.